United States Patent
Barankanira et al.

(10) Patent No.: US 8,412,202 B2
(45) Date of Patent: Apr. 2, 2013

(54) METHOD FOR ACCESSING A SERVICE FROM A USER'S TERMINAL VIA A HETEROGENEOUS NETWORK IN WHICH SEVERAL TYPES OF ACCESS ARE AVAILABLE

(75) Inventors: Delphin Barankanira, Villejuif (FR); Boris Pinatel, Paris (FR); Bruno Tossou, Montgeron (FR)

(73) Assignee: France Telecom, Paris (FR)

( * ) Notice: Subject to any disclaimer, the term of this patent is extended or adjusted under 35 U.S.C. 154(b) by 359 days.

(21) Appl. No.: 12/311,736

(22) PCT Filed: Oct. 12, 2007

(86) PCT No.: PCT/FR2007/052132
§ 371 (c)(1),
(2), (4) Date: Apr. 10, 2009

(87) PCT Pub. No.: WO2008/043970
PCT Pub. Date: Apr. 17, 2008

(65) Prior Publication Data
US 2010/0003975 A1 Jan. 7, 2010

(30) Foreign Application Priority Data
Oct. 13, 2006 (FR) .................................... 06 09015

(51) Int. Cl.
*H04W 36/00* (2009.01)
*H04W 72/00* (2009.01)

(52) U.S. Cl. ........ 455/437; 455/438; 455/439; 455/442; 455/452.1; 370/331

(58) Field of Classification Search .................. 370/236, 370/331, 332, 338, 395.5; 455/418, 436, 455/437, 442, 444, 574
See application file for complete search history.

(56) References Cited

U.S. PATENT DOCUMENTS

| | | | |
|---|---|---|---|
| 2004/0218605 A1* | 11/2004 | Gustafsson et al. | 370/395.2 |
| 2005/0148321 A1* | 7/2005 | Igarashi et al. | 455/411 |
| 2006/0056311 A1* | 3/2006 | Han et al. | 370/252 |
| 2006/0176855 A1* | 8/2006 | Oh et al. | 370/331 |
| 2008/0095119 A1* | 4/2008 | Bachmann et al. | 370/332 |
| 2009/0232088 A1* | 9/2009 | Wisely | 370/331 |

FOREIGN PATENT DOCUMENTS

| | | |
|---|---|---|
| EP | 1708526 | 10/2006 |
| WO | WO 2005/032082 | 4/2005 |
| WO | WO 2006/084776 | 8/2006 |

OTHER PUBLICATIONS

"A flexible handover mechanism for seamless service continuity in heterogeneous environments", Kaloxylos, et al.; Computer Communications, Elsevier Science Publishers BV, Mar. 31, 2006, pp. 717-729.

\* cited by examiner

*Primary Examiner* — Michael Thier
*Assistant Examiner* — Awet Haile
(74) *Attorney, Agent, or Firm* — Knobbe Martens Olson & Bear LLP (57) ABSTRACT

The invention relates to a method for accessing a service from a user's terminal (1) through a heterogeneous network (3) in which several access types (5, 7, 9, 11) are available. The method comprises the following steps: upon reception of a request outputted by the terminal (1) for accessing a service, selecting through an access selection server (17) an access of the heterogeneous network (3) for the terminal (1), said access selection step including a resources reservation step (61) at the selected access; and sending (65) a selected access identifier to the terminal (1) through the access selection server (17).

9 Claims, 5 Drawing Sheets

METHOD FOR ACCESSING A SERVICE FROM A USER'S TERMINAL VIA A HETEROGENEOUS NETWORK IN WHICH SEVERAL TYPES OF ACCESS ARE AVAILABLE

This application claims the benefit of PCT/FR2007/052132 filed on Oct. 12, 2007, and French Application No. 0609015 filed on Oct. 13, 2006, the contents of which are hereby incorporated herein by reference for all purposes in their entirety.

The invention relates to a method for accessing a service from a user's terminal via a heterogeneous network in which several types of access are available.

The invention relates more particularly to heterogeneous networks, which are multi-supplier networks using different access technologies, using the IP ("Internet Protocol") protocol as transport protocol. It relates in particular to heterogeneous networks in which the available accesses are Wi-Fi (WLAN, I-WLAN), WIMAX accesses, as well as generation 2 type GSM ("Global System for Mobile Communications"), 2.5 GPRS ("General Packet Radio Service") or 3 UMTS ("Universal Mobile Telecommunication System") mobile telephony accesses, from one or more operators.

In recent years, the use of mobile terminals has been brought within everyone's reach, consumption of multimedia services has seen strong growth and new wireless technologies have appeared. The need to be connected at all times, irrespective of location and the means used, has led to the development of a significant number of types of heterogeneous access, applications and terminals. In order to optimize the use of these different resources, the current trend is for the convergence of networks and services. In this situation, the user must always be connected to an access, irrespective of type, giving him the best data transfer rate, tariffs, etc. As a result, the access-selection mechanisms must be optimized and extended.

Moreover, mobile terminals are currently equipped with several network interfaces, which can be of different types, wireless or even cellular. The requirements of the different applications can lead to the choice of one interface over another. The connection must then be established via the best interface depending on requirements in terms of data transfer rate, capacity, error rate etc. After establishing a session, the state of the communication can lead to the existing communication being moved to another interface. As a result, it can be judicious to choose the best interfaces and accesses to the connection in order to limit the problems mentioned above.

Currently, two types of selecting access and connection to the network are standardized by the 3GPP "$3^{rd}$ Generation Partnership Project". These are manual mode and automatic mode. In manual mode, the user chooses an access to which he wishes to connect, based on available access identifiers. This mode is not favoured if the user wishes to achieve transparent mobility and to be offered a facility of using the service. For example in manual mode, the availability of the same services, quality of service and resources, in the case of a change of access, are not guaranteed.

The automatic mode is favoured by operators because it optimizes the use of resources and minimizes the cost of changing between operators. This mode makes using the network user-friendly as it requires little (or no) intervention by the user. In this mode two lists of access-identifiers are stored or provided to the terminal. The latter attempts to connect itself successively to the different available accesses until it finds the access provided by its operator or an access from another operator having roaming agreements with its operator.

Rules for choosing access can be implemented. The two existing modes do not allow an optimized and intelligent selection as regards access. This brings about many exchanges between the terminal and the heterogeneous network and a consequence thereof is to slow down the connection of the terminal to the network.

An optimization of this access-selection mechanism was envisaged in the international application no. WO 2005/032082 filed by SAMSUNG ELECTRONICS.

This document defines a method for connecting the terminal to one of the different accesses with which coverage zones overlap and which are accessible at the same time by the terminal. This mechanism uses the principle of preset priority. The terminal scans the list of available accesses starting from the first by following the order of priority until connection to the network is achieved.

Therefore, in the state of the art, only the terminal has the possibility of choosing the access and in certain cases the network proposes new access priorities based on static criteria. These mechanisms do not make it possible to guarantee that the chosen access can offer the quality of service expected by the user for accessing the desired services, in particular in terms of bandwidth.

Thus, a correctly-authenticated user can see his access request to certain services refused or even see himself disconnected from the network.

The method of the document mentioned above does not allow the connection to be optimized. In fact, although the access list is ordered, after a successful connection the terminal can encounter problems linked to the quality of service.

Therefore there exists a need to solve this problem of connection optimization.

To this end, the object of the invention is a method for accessing a service from a user's terminal via a heterogeneous network in which several types of access are available, characterized in that it comprises the following steps:

upon reception of a request sent by the terminal for accessing the service, selection, by an access-selection server, of an access of the heterogeneous network for the terminal, said access-selection step comprising a step of reserving resources from the selected access; and sending by the access-selection server of a selected access identifier to the terminal.

Thus, the invention allows the drawbacks of the methods of the state of the art to be overcome by providing an access to the user by offering him the best conditions for obtaining the service required. In fact, the access-selection step comprises a step of reserving resources from the selected access by the access-selection server. The point of this reservation is to verify the availability of the resources from start to finish.

Other features of the invention are stated hereinafter.

According to one aspect of the invention, the sending step also comprises the sending to the terminal of an identifier of resources reservation.

This identifier is used by the terminal when it connects to the selected access and allows it to obtain the resources reserved.

According to another aspect of the invention, the selection step comprises:

a step of negotiating resources with a network access from a list of identifiers of accesses visible from the terminal;

in case negotiation with said access fails, it carries out a negotiation with another access from the list; and in case negotiation with all the accesses from the list fails, it selects the access leading to the best negotiation result.

When the negotiations have all failed, the access-selection server proposes the access offering the best compromise basing this on the result of the negotiations of the resources with the accesses from the list.

The step of connecting the terminal to the network comprises a step in which the terminal provides:
authentication parameters;
a list of identifiers of accesses visible from the terminal; and
criteria for selecting and ranking the identifiers of accesses visible from the terminal.

The provision of authentication parameters, the provision of the list of identifiers of accesses visible from the terminal and the provision of criteria for selecting and ranking allow the connection to the required service to be optimized.

The access-selection step comprises a step of ranking the list of the access identifiers provided by the terminal on the basis of information provided by the terminal and dynamic information obtained by learning concerning the characteristics of previous access requests provided by a local database.

This allows the server to obtain a rapid and relevant selection of access.

The access-selection step comprises a step of updating the information concerning the characteristics of previous access requests in the local database.

This allows there to be a learning mechanism in order to prevent failure situations which are repetitive or reproduced for the terminal.

According to another aspect a subject of the invention is also a system for accessing a service from a user's terminal via a heterogeneous network, the system comprising several different types of access, characterized in that it comprises:
an access-selection server present in the heterogeneous network suitable for receiving a request to access the service of the terminal, comprising;
a) means of selecting an access for the terminal;
b) means of reserving resources from the selected access; and
c) means of sending a selected access identifier to the terminal.

According to another feature:
the different accesses are wireless Wi-Fi or WIMAX accesses or generation 2 or 2.5 or 3 mobile telephony accesses, from one or more operators.

According to yet another aspect, a subject of the invention is also an access-selection server, characterized in that it comprises:
(a) means of selecting an access in response to the reception of the access request;
(b) means of reserving resources from the selected access; and
(c) means of sending a selected access identifier to the user's terminal.

The advantages stated for the method according to the invention can be adapted to this system.

According to a feature of the invention, it comprises means of sending to the terminal an identifier of resources reservation.

According to an aspect of the invention, the server selection is characterized in that:
said means of selection comprise means of negotiating resources from a network access belonging to a list of identifiers of accesses visible from the terminal;
in case negotiation with said access fails, said means of negotiation are capable of negotiating with another access from the list; and
in that, in case negotiation with all the accesses from the list fails, they are capable of selecting the access leading to the best negotiation result.

According to another feature, it comprises means of receiving a list of access and of the service identifiers requested by the user; and selection and ranking criteria from the user's terminal;

According to another aspect, a subject of the invention is a computer program product downloadable from a communications network and/or stored on a support which can be read by a computer and/or executed by a microprocessor of an access-selection server, characterized in that it comprises program code instructions for executing the method according to the invention.

The invention will be better understood on reading the following description, given by way of example only and with reference to the attached drawings, in which.

Figure 1:
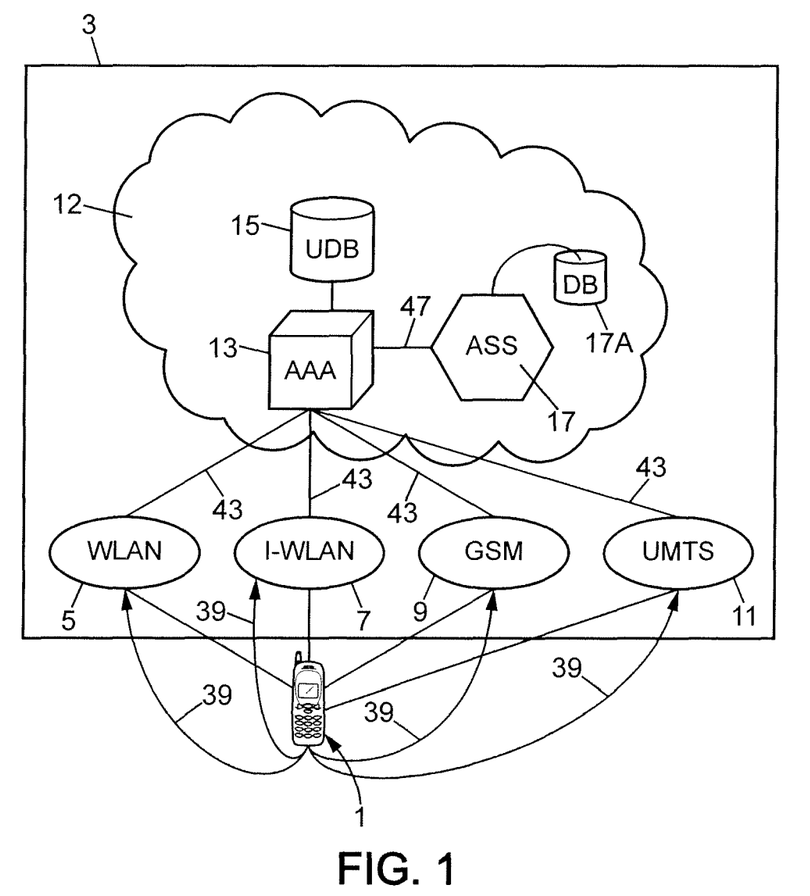
FIG. 1 is a block diagram illustrating the structure of a heterogeneous network according to an embodiment of the present invention.

In FIG. 1, a heterogeneous network according to an embodiment of the invention is represented.

A user's terminal 1 is suitable for accessing a service, in a heterogeneous network 3, represented in FIG. 1. This heterogeneous network 3 comprises several types of available access. These accesses are, according to an embodiment of the invention:
an access to a local wireless WLAN ("Wireless Local Area Network") network 5;
an access to an industrial wireless I-WLAN ("Industrial WLAN") network 7;
a second generation mobile access of GSM type or 2.5 generation of GPRS type 9;
a third generation mobile access of UMTS type 11.

According to an embodiment of the invention, the heterogeneous network 3 has an architecture defined by 3GPP within the framework of the specification of the developments of the cellular network based on IMS ("IP Multimedia Subsystem"). The network 3 comprises a domestic network 12 suitable for an operator. The accesses 5, 7, 9, 11 belong to other domestic networks suitable for other operators. This architecture separates the accesses 5, 7, 9 and 11 from the domestic network 12 of the operator offering the service to the user. The domestic network 12 comprises an authentication server 13. This authentication server 13 is called AAA ("Authentication Authorization Accounting") server in the architecture defined by 3GPP.

It allows operators to authenticate the users in the network, to authorize the services for the users and to monitor use of services.

The domestic network 12 also comprises a database of profiles of users 15 comprising the profiles of the operator's subscribers. This database contains information about the subscriptions and the characteristics of the terminals of the subscribers.

According to the invention, the domestic network 12 also comprises an access-selection server 17 to which a local database 17A is connected.

Figure 2:
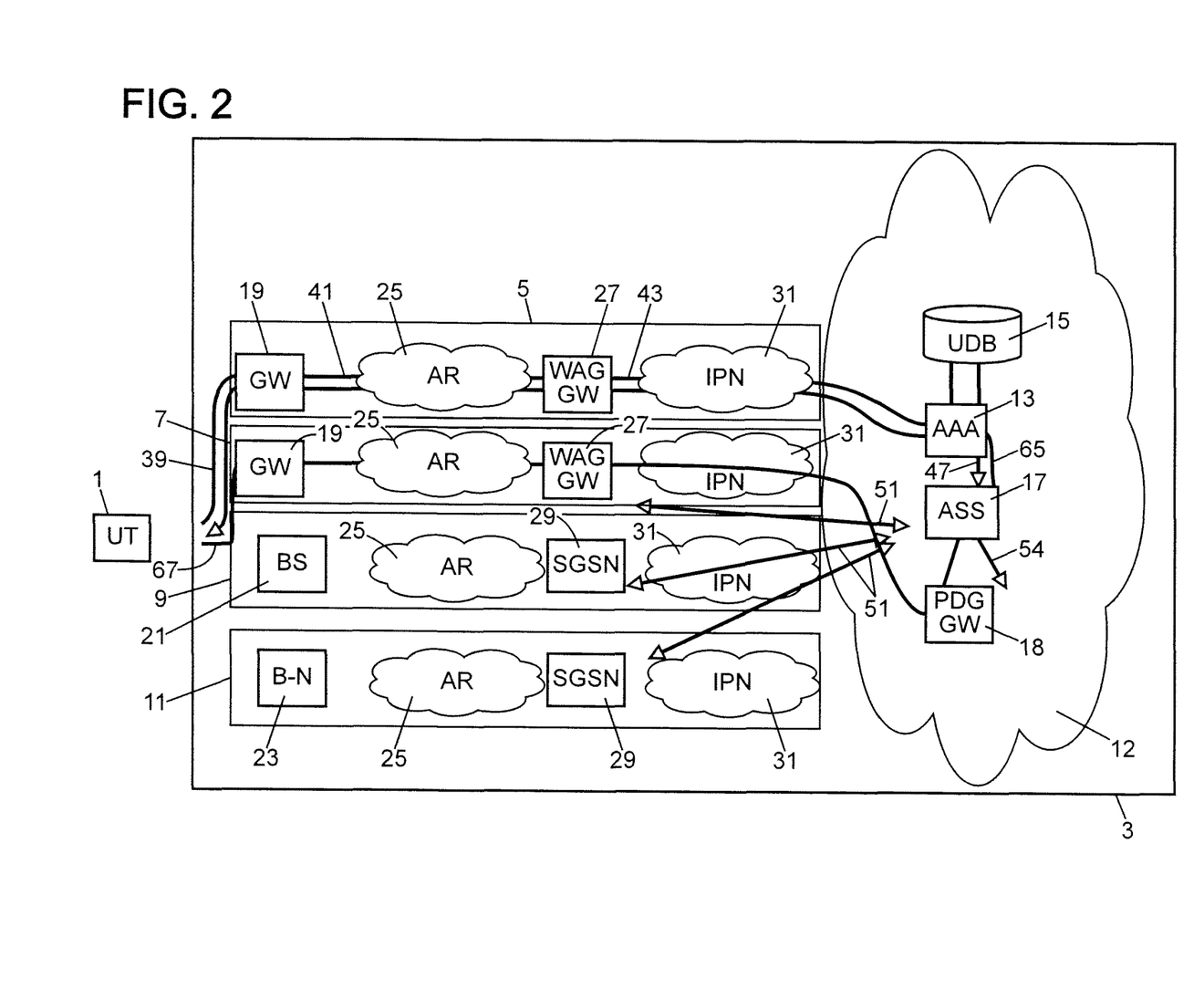
FIG. 2 is a block diagram illustrating the structure and the operation of the method of access according to an embodiment of the invention.
Figure 3:
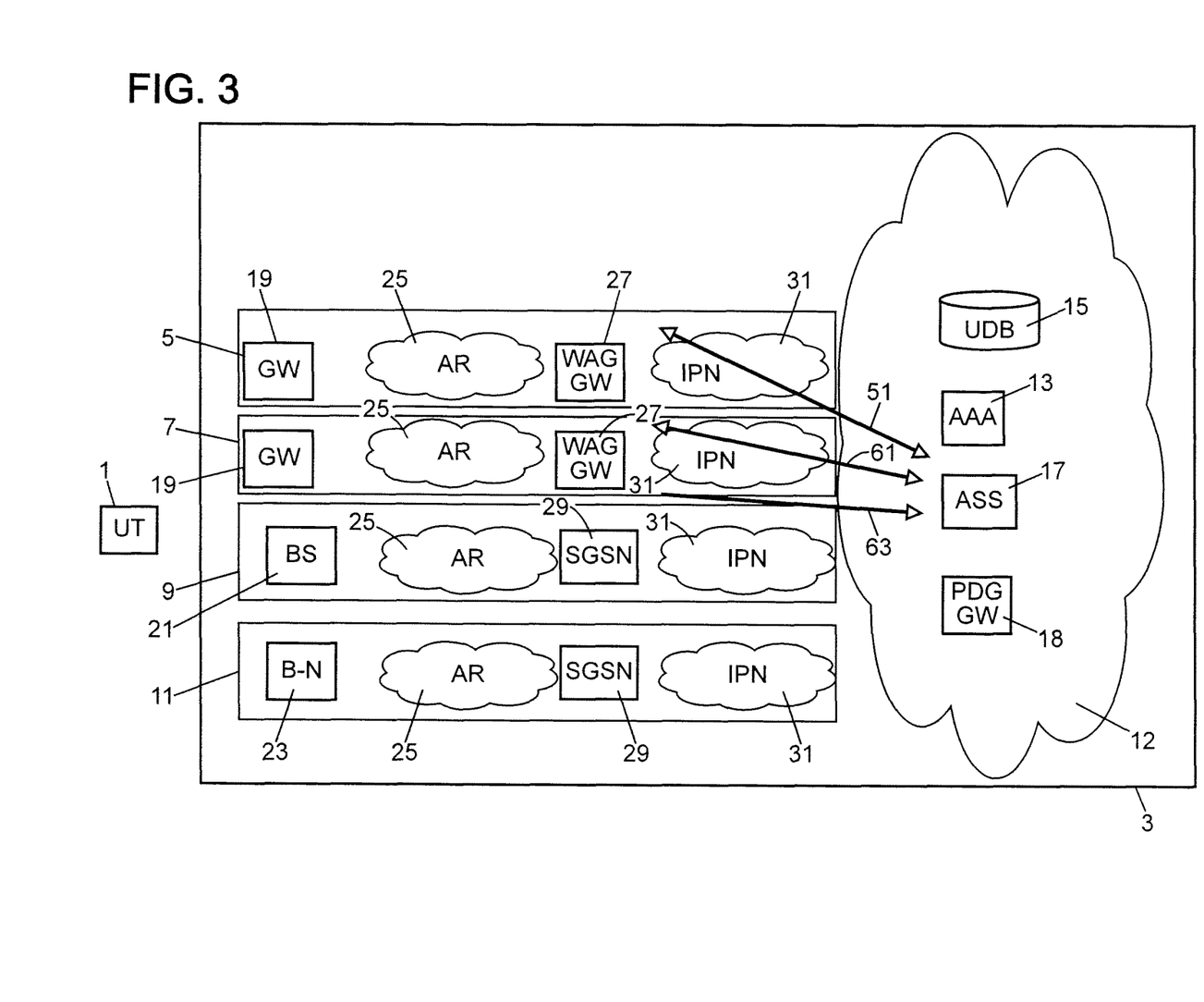
FIG. 3 is a block diagram illustrating the structure and the operation of the access-selection step by the access-selection server, according to an embodiment of the invention.

According to an embodiment of the invention, the domestic network 12 also comprises a packet data gateway (PDG) 18, represented in FIGS. 2 and 3.

FIG. 2 illustrates in detailed manner the structure of the access system according to the invention.

The different accesses 5, 7, 9 and 11 available on the heterogeneous network 3 are provided with access points which allow the user's terminal 1 to connect to it.

In the case of WLAN wireless accesses 5 and I-WLAN wireless accesses 7, these access points are gateways 19.

In the case of a GSM or GPRS access 9, these access points are base stations 21.

Finally, in the case of a UMTS access 11, these access points are base stations called B-nodes 23.

Moreover, the available accesses 5, 7, 9 and 11 comprise access routers 25 to route the data transmitted from the terminal 1 to a wireless access gateway (WAG) 27 in the case of a WLAN wireless access 5 and a I-WLAN wireless access 7 or to a serving GPRS support node (SGSN) 29 in the case of a mobile access 9 or 11. The WAG gateway 27 or the SGSN node 29 constitutes the access point to a transport network 31 of IP type, comprised in the corresponding access 5, 7, 9 or 11, the role of which is to route the data transmitted from the terminal 1 to the domestic network 12.

The operation of the method and system of access according to the invention will now be described in reference to FIGS. 1 to 5.

Figure 4:
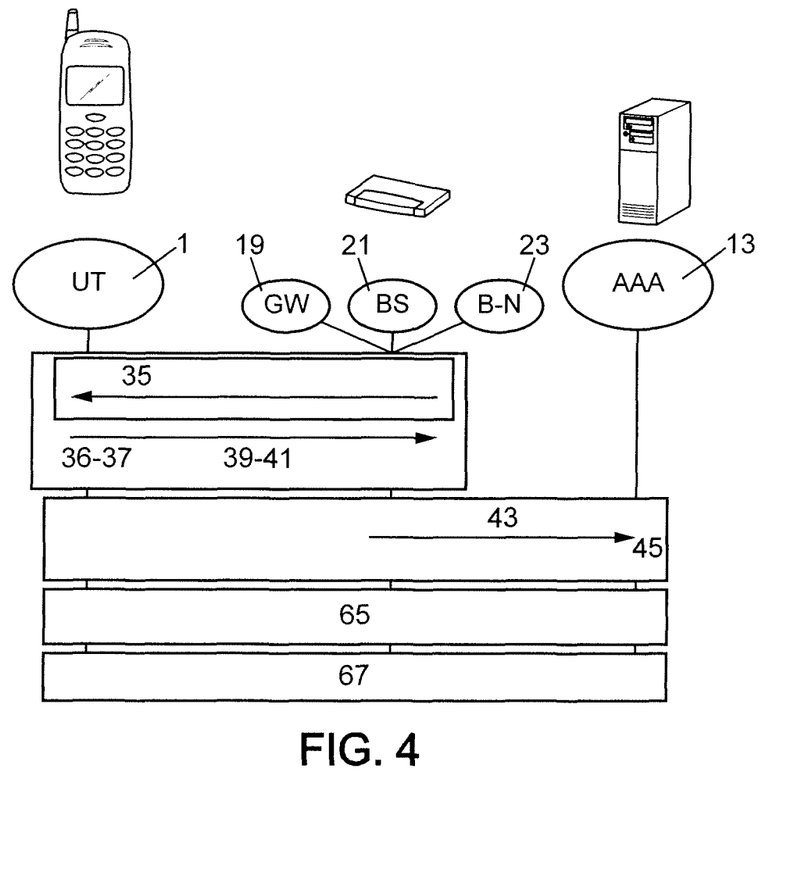
FIG. 4 is a flow chart illustrating the operation of the method of access according to an embodiment of the invention.

According to the invention, the terminal 1 obtains at its request in step 35, as illustrated in FIG. 4, the list of the identifiers of all the available accesses from the gateway 19 of the base station 21 or the B-node 23. For WLAN type wireless accesses 5 and 7, this identifier is the Service Set Identifier (SSID). For mobile accesses 9 and 11, this identifier is the PLMN ("Public Land Mobile Network") identifier.

The terminal 1 sorts in step 36 the accesses available depending on the subscriber's preferences and habits. According to an embodiment of the invention, the terminal 1 carries out this ranking off-line in order to prioritize and rank the list of accesses. The terminal 1 thus has, at all times, a ranked list comprising the different accesses to which the user has already been connected at least once.

When the user wishes to access a given service on the network 3, the terminal 1 chooses in step 37 one of the available accesses in its list and establishes a connection in step 39. This connection in step 39 is carried out using an access request to the gateway 19 in the case where the chosen access is a wireless access 5 or 7 or to the base station in the case where the chosen access is a GSM or GPRS mobile access 9 or to the B-node in the case where the chosen access is a UMTS mobile access 11. This request is transmitted in step 41 through the access chosen to the access gateway WAG 27 in the case of a wireless access 5 or 7 or to the support node SGSN 29 in the case of a second or third generation mobile access 9 or 11. The request is then relayed in step 43 through the transport network of IP type 31 to the authentication server 13.

This access request comprises the following elements:
the parameters necessary for authentication. These are for example the parameters of authentication protocols of EAP-SIM ("Extensible Authentication Protocol-Subscriber Identify Module") type used in particular during a GSM or EAP-AKA ("Extensible Authentication Protocol-Authentication and Key Agreement") type access used in particular during a UMTS access, the identifiers and the information that terminal 1 has about the available accesses, in particular concerning the bandwidth or the power of the signal;

the selection and ranking criteria which are for example information about the bandwidth required for the desired service and/or the class of service of the service, as well as information about the parameters of the terminal 1 such as the battery or the display capacity.

The access request having been received by the authentication server 13, the latter authenticates in step 45, as shown in FIG. 4, the terminal 1. In the case of a successful authentication of terminal 1, the authentication server 13 sends in step 47, as illustrated in FIG. 2, the access request as well as the user's profile contained in the database 15 to the access-selection server 17, as shown in FIGS. 1 and 2.

Figure 5:
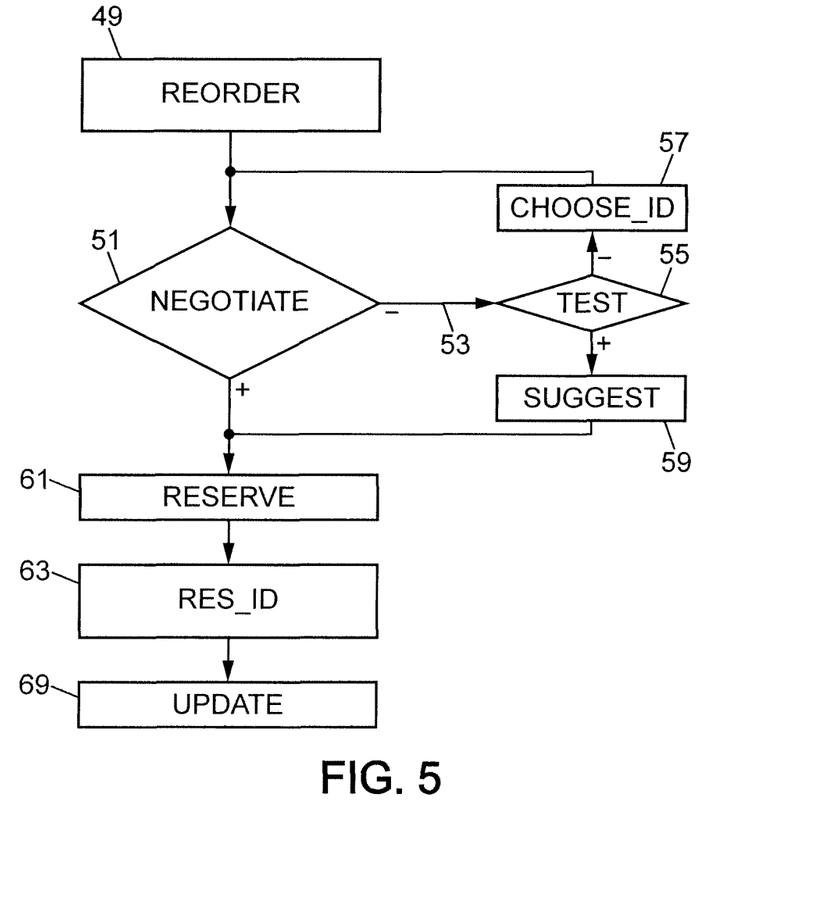
FIG. 5 is a flow chart illustrating the operation of the access-selection step by the access-selection server, according to an embodiment of the invention.

The access-selection server 17 reorders in step 49 as represented in FIG. 5 the pre-ranked list of access identifiers provided by the terminal 1, depending on the ranking criteria raised by the terminal 1 to the authentication server 13 in its access request as well as depending on static elements originating from the information system of the operator and the possible roaming agreements. This ranking also takes into account the dynamic information obtained by learning that the access-selection server 17 has stored, for each access, in the local database 17A. This dynamic information comprises for example some observed characteristics of the accesses, in particular concerning the rejection rate of the access requests (the cut-off frequency as well as the comparison of the negotiated data transfer rate and the allocated data transfer rate). This local database 17A therefore comprises a list of all the accesses already ranked by this access-selection server 17 for a previous user's terminal 1. Finally, this ranking takes into account the user's profile contained in the database 15. The access-selection server 17 then scans this new ranked list of access identifiers and negotiates in step 51, as represented in FIGS. 2, 3 and 5, the resources required with each access.

The aim of this negotiation is to find the first access 25 from the list which responds favourably to the criteria of quality of service. Thus, for each access, the access-selection server 17 deduces, from the identifier corresponding to this access, the topological data of the access enabling it to negotiate with each access. The elements interrogated are either the relays or gateways 27 or the nodes 29 as shown in FIGS. 2 and 3. In the case where the access is a I-WLAN type access 7, the access-selection server 17 interrogates the gateway PDG 18 in step 52 as shown in FIG. 2.

During this negotiation of resources in step 51, the access-selection server ensures that the quality of service is guaranteed from start to finish. The exchange between the access-selection server 17 and the gateway 27 or the access node 29 is carried out in the following manner. Firstly, the access-selection server 17 requests the resources from the gateway 27 or the node 29. Then, this entity 27 or 29 sends it information about the quality of service available.

In case of failure in step 53 of the negotiation of resources with a given access which is not the last of the list (test in step 55) in particular because of the insufficient quality of service available with this access, the access-selection server 17 chooses in step 57 the following identifier and carries out a negotiation of resources with this access. According to an embodiment of the invention, the access-selection server 17 establishes an ordered list ranking the accesses depending on the result of the negotiations and updates this dynamic data about the accesses after each negotiation of resources. This list is used if no negotiation gives complete satisfaction. In fact, if the current access is the last on the list and the negotiations have all failed, the access-selection server 17 suggests in step 59 the access offering the best compromise based on the ranking established during negotiation of the resources. If not, an error message is sent to the terminal.

If an access having the desired resources is found after the step of negotiating the resources 51, in step 61 the access-selection server 17 reserves resources. This reservation results in an identifier of resources reservation being obtained in step 63. This identifier is used by the terminal 1 when it connects to the selected access and allows it to obtain the resources reserved. This identifier of resources reservation can be a key or a certificate or a ticket etc.

The access-selection server 17 then in step 65 sends back a success message to the terminal 1 containing the selected access identifier and the identifier of resources reservation.

The access-selection server 17 updates the list of accesses previously ranked in the database 17A using the results of the negotiations obtained for the accesses showing in the ordered list which it established for the terminal 1.

Upon reception of the information necessary to connect to the selected access by the access-selection server 17, the terminal 1 connects in step 67 to the access which has been assigned to it and requests authorization to access the service.

According to an embodiment of the invention, a fast reauthentication is required at the terminal 1 when it connects to the new access selected by the access-selection server 17, for reasons of security. This fast reauthentication can use for example the EAP-SIM fast reauthentication protocols.

After all the steps described above, the access-selection server 17 updates in step 69 the ranking of the list of the access identifiers.

Thus, the invention provides the user an access offering him the best conditions to take advantage of the services to which he has subscribed. If not, it provides him with the access offering the best compromise in terms of quality of service and cost.

The advantage of the method of access of the present invention is to allow the user to connect using any available access. This is the heterogeneous network 3, using the access-selection server 17, which will assign him the best access for the desired service. It is worth noting that this access-selection server can be a piece of equipment on its own or its functionalities can be implemented in equipment which is permanently in the network 3, such as for example the authentication server 13 or the gateway 33.

Moreover, the reservation of resources can use the standard Resource ReSerVation Protocol RSVP.

The benefit of this reservation is to enable the verification of the availability of the resources from start to finish depending on the user's profile. These resources, although reserved, are not preempted. The reservation also allows the application of the rules monitoring admission. In fact, depending on the quantity of current traffic and the traffic forecasts, the network will accept or reject the request.

Once the user is connected to the network, depending on the service requested by the user, the network dynamically re-evaluates the resources that it has allocated in real time to the user depending on the traffic, the user's profile and the network. These functionalities are the responsibility of the operator and are not covered by this patent.

The invention claimed is:

1. A method for accessing a service from a user's terminal via a heterogeneous network in which several types of access are available, comprising the following steps:
    upon reception of a request for accessing the service, of a list of identifiers of accesses visible from the user terminal and of criteria for selecting and ranking the identifiers of accesses visible from the user terminal, sent by the user terminal, selection, by an access-selection server of an access of the heterogeneous network for the user terminal, said access-selection step comprising a step of reserving resources from the selected access; and
    sending by the access-selection server of a selected access identifier to the user terminal;
    wherein the access-selection step further comprises a step of ranking the list of the access identifiers provided by the user terminal on the basis of information provided by the user terminal and dynamic information obtained by learning concerning the characteristics of previous access requests provided by a local database;
    wherein the access-selection step further comprises:
        negotiating resources from a network access belonging to a list of identifiers of accesses visible from the user terminal;
        when negotiation with said access fails, negotiating with another access from the list and updating the ranked list of identifiers after each negotiation of resources; and
        when negotiation with all the accesses from the list fails, selecting the access leading to the best negotiation result based on the updated list of the access identifiers.

2. The method for accessing a service according to claim 1, wherein the sending step further comprises sending to the user terminal an identifier of resources reservation.

3. The method according claim 1, wherein the access-selection step comprises a step of updating the information concerning the characteristics of previous access requests in the local database.

4. The method according to claim 3, wherein said information comprises information provided by the user terminal and dynamic information obtained by a learning mechanism.

5. A non-transitory computer-readable storage medium, with an executable program stored thereon, wherein the program comprises program code instructions for executing the method according to claim 1.

6. A system for accessing a service from a user's terminal in a heterogeneous network, the system comprising several different types of access, the system comprising:
    an access-selection server present in the heterogeneous network suitable for receiving a request to access the service, a list of identifiers of accesses visible from the user terminal and criteria for selecting and ranking the identifiers of accesses visible from the user terminal, sent by the user terminal, the access-selection server comprising: a memory and a processor, wherein the memory stores instructions that when executed by the processor causes the processor to:
    select an access for the user terminal;
    reserve resources from the selected access; and
    send a selected access identifier to the user terminal;
        wherein the selecting an access comprises ranking the list of the access identifiers provided by the user terminal on the basis of information provided by the user terminal and dynamic information obtained by learning concerning the characteristics of previous access requests provided by a local database;
        wherein the selecting an access further comprises:
            negotiating resources from a network access belonging to a list of identifiers of accesses visible from the user terminal;

when negotiation with said access fails, negotiating with another access from the list and of updating the ranked list of identifiers after each negotiation of resources; and when negotiation with all the accesses from the list fails, selecting the access leading to the best negotiation result based on the updated list of the access identifiers.

7. The access system according to claim 6, wherein the different accesses are wireless Wi-Fi or WIMAX accesses or 2 or 2.5 or 3 generation mobile telephony accesses from one or more operators.

8. An access-selection server, comprising: a memory and a processor, wherein the memory stores instructions that when executed by the processor causes the processor to:

receive a request to access a service, a list of identifiers of accesses visible from a user's terminal and of criteria for selecting and ranking the identifiers of accesses visible from the user terminal, sent by the user terminal;

select an access in response to the reception of the access request;

reserve resources from the selected access; and send a selected access identifier to the user's terminal;

wherein the selecting an access comprises ranking the list of the access identifiers provided by the user terminal on the basis of information provided by the user terminal and dynamic information obtained by learning concerning the characteristics of previous access requests provided by a local database;

wherein the selecting further comprises negotiating resources from a network access belonging to a list of identifiers of accesses visible from the user terminal;

when negotiation with said access fails, negotiating with another access from the list and of updating the ranked list of identifiers after each negotiation of resources; and when negotiation with all the accesses from the list fails, selecting the access leading to the best negotiation result based on the updated list of the access identifiers.

9. The access-selection server according to claim 8, further comprising sending to the user terminal an identifier of resources reservation.

* * * * *

UNITED STATES PATENT AND TRADEMARK OFFICE
CERTIFICATE OF CORRECTION

| | | |
|---|---|---|
| PATENT NO. | : 8,412,202 B2 | Page 1 of 1 |
| APPLICATION NO. | : 12/311736 | |
| DATED | : April 2, 2013 | |
| INVENTOR(S) | : Barankanira et al. | |

It is certified that error appears in the above-identified patent and that said Letters Patent is hereby corrected as shown below:

In the Specification

In column 7 at line 53, Change "preempted." to --pre-empted.--.

In the Claims

In column 8 at line 32, In Claim 3, Change "according claim" to --according to claim--.

Signed and Sealed this
Twelfth Day of November, 2013

Teresa Stanek Rea
*Deputy Director of the United States Patent and Trademark Office*